United States Patent [19]

Bader et al.

[11] 4,125,797

[45] Nov. 14, 1978

[54] DRIVE MECHANISM WITH AN ELECTRIC MOTOR FOR TRACKLESS VEHICLES

[75] Inventors: Christian Bader, Boblingen; Helmut Schmidt, Rettigheim, both of Germany

[73] Assignee: Deutsche Automobilgesellschaft mbH, Germany

[21] Appl. No.: 749,428

[22] Filed: Dec. 10, 1976

[30] Foreign Application Priority Data

Dec. 11, 1975 [DE] Fed. Rep. of Germany ....... 2555668

[51] Int. Cl.² .............................................. H02P 3/12
[52] U.S. Cl. ..................................... 318/270; 318/380
[58] Field of Search ............... 318/259, 269, 270, 274, 318/338, 364, 379, 380

[56] References Cited

U.S. PATENT DOCUMENTS

| | | | |
|---|---|---|---|
| 2,397,214 | 3/1946 | Snyder | 318/270 X |
| 2,629,849 | 2/1953 | Barnes | 318/380 X |
| 3,794,898 | 2/1974 | Gross | 318/380 |
| 3,984,742 | 10/1976 | Bader | 318/338 |

Primary Examiner—Robert K. Schaefer
Assistant Examiner—W. E. Duncanson, Jr.
Attorney, Agent, or Firm—Craig & Antonelli

[57] ABSTRACT

A drive by means of an electric motor for trackless vehicles, in which the rotational speed adjustment takes place by changing the field energization of the electric motor, and with a separating clutch connected behind the motor as well as a changespeed transmission having at least two speeds in the forward driving direction. An energizing current controller for the field winding is provided whose energizing current-desired value is predetermined by another current controller to which are fed, on the one hand, the actual value of the armature current and, on the other, a desired value which is determined by the drive and/or brake pedal when the separating clutch is not actuated, and which is automatically determined by a synchronizing controller or is set to zero during the actuation of the separating clutch. A relay is provided for effecting short-circuiting of the armature when the ignition is turned off and monitoring devices are provided for monitoring operating conditions of the motor and influencing the motor or providing an indication in accordance with the monitored conditions.

20 Claims, 4 Drawing Figures

DRIVE MECHANISM WITH AN ELECTRIC MOTOR FOR TRACKLESS VEHICLES

The present invention relates to a drive utilizing an electric motor having an armature and a field winding for trackless vehicles, especially for street vehicles, in which the rotational speed adjustment takes place by varying the field energization of the motor and which includes a separating clutch arrangement connected behind the motor as well as a change-speed transmission having at least two speeds in the forward driving direction as disclosed in commonly assigned U.S. Pat. No. 3,984,742 issued Oct. 5, 1976, the subject matter of which is incorporated by reference herein.

As described in the aforementioned patent, a first energizing current control controls the energization of the field winding and a second current control produces a desired value of field energizing current which is operatively connected with its output to the input of the first current control. The second current control has two inputs to which are applied, on the one hand, the actual of the armature current and, on the other, a desired value for the armature current. A mechanism including a selectively operable device is provided for determining the desired value of the armature current with a nonactuated separating clutch arrangement and an automatic device is provided for automatically controlling the desired value of the armature current when the separating clutch arrangement is actuated. In particular, a switch to be opened upon braking is associated with the brake pedal and the switch is disposed in a brake relay energizing circuit wherein a first operating or make contact of the brake relay, upon energization of the brake, interrupts the circuit of the desired driving current value. A clutch pedal is associated with a switch which is closed when the clutch is disengaged and this switch is located in the energizing circuit of a clutch relay such that when the clutch is not operated a desired armature current value determined by the drive pedal or brake pedal and, when the clutch is operated, a desired armature current value determined by a conventional synchronizing controller or value zero is fed to the second current control. Further, a blocking diode is provided between the switches which prevents an energization of the clutch relay during braking and makes it possible to energize the brake relay during clutch disengagement.

The characterizing differences exhibited by a drive arrangement of this type of construction as compared to a corresponding drive arrangement with an internal combustion engine have been discussed in detail in the aforementioned patent. The differences result essentially from the fact that, with the control feature of "field weakening", the power derived from the electric motor can be affected only if the speed of the motor is higher than the value of the rated speed determined by the full energization and the rated battery voltage. As soon as the speed of the motor falls below this value of the rated speed, the power supplied by the motor can no longer be affected by the field weakening and, in particular, short-circuit-type armature currents can occur with corresponding motor torques, which must be avoided at any case. This operating behavior thus is basically different from that of a drive arrangement with an internal combustion engine wherein the power supply can be eliminated in any operating condition by closing the throttle valve or by blocking the fuel feed.

Additionally, in an electric drive mechanism, the possibility of regenerative braking is basically provided, and an effort is made to utilize such regenerative braking advantageously for saving energy in such a drive mechanism, whereas this mode of operation is not at all possible in connection with a drive mechanism with an internal combustion engine.

Finally, an internal combustion engine comes very quickly to a standstill, due to the braking torque caused by the compression, after the engine has been shut off, whereas an electric motor, when the power flow to the drive wheels is interrupted, is braked merely on the basis of the unavoidable bearing friction, which can take a time period of 10 seconds or longer.

These characteristic differences make it necessary to provide a special arrangement of protective and control devices in such a drive mechanism with an electric motor, wherein the speed adjustment takes place by means of field variation or weakening, so that the mode of operation customary in a vehicle with an internal combustion engine can be retained and to prevent that the drive mechanism assumes inappropriate operating conditions.

For this purpose, the aforementioned patent provides that, once the engine speed falls below the value of the rated speed upon full energization, connected with a rise in the armature current which cannot be affected by the energization, a series resistance is inserted for limiting the armature current between the battery and the armature end connections. This operating condition occurs always in those cases when, during startup at a value of the engine speed which is too low, the speeds are shifted to the next-higher one. Although this securely protects the motor, the drive torque is thereby reduced to such an extent that the gear or speed shifting must proceed backwards, and the vehicle must be accelerated in the next-lower speed before a speed shift operation can once again be initiated. This can lead to an interference in the road traffic by the vehicle. On the other hand, the electric motor is able to withstand even greater overloads, especially since in this operating condition the energization is always at its full value and thus no difficulties need to be expected with regard to commutation, if these overloads are overcome quickly enough. Therefore, when shifting to the next-higher speed, a certain overload which, though, must not exceed a certain extent, can be tolerated without abruptly reducing the motor torque by the insertion of the series resistance each time the engine speed falls below its rated value, as is the case in the aforementioned patent. A similar operating condition also occurs if an increased driving resistance is encountered for a short period of time, for example when the vehicle is driven on a ramp. Also in this case, it is desirable to be able to place a brief overload on the engine without having to shift speeds or gears every time.

An additional measure is required when the vehicle is started up. In the aforementioned patent, it is possible, if neither the clutch pedal nor the brake pedal is applied during starting, that the vehicle is set into slight motion directly after the starting operation, since the motor is thereby connected to the battery by way of the series resistor. This unaccustomed behavior of the vehicle may lead to difficulties.

An additional difficulty can be encountered in the drive mechanism described in the patent during the stopping of the vehicle, if the power flow between the motor and the drive wheels is interrupted, which customarily is effected by disengaging the separating clutch.

Although it is possible to bring the vehicle to a standstill with the aid of the foot brake, this does not apply to the electric motor which is merely braked by its minor bearing friction. If the driver, assuming that the vehicle drive mechanism has been stopped, releases the previously depressed clutch pedal, the energy still stored in the flywheel mass of the motor causes a sudden, jump-like advancement of the vehicle, which can lead to an endangering situation.

It is therefore an object of this invention to eliminate the disadvantages which may be inherent in the drive mechanism of the aforementioned patent and, moreover, to provide a signalling arrangement which make it possible for the driver to recognize whether the drive mechanism has reached an inappropriate operating condition.

This objective is attained in accordance with the present invention by the provision of a stop relay which is connected to the battery voltage when the ignition is on. The stop relay includes a break contact which short-circuits the armature winding of the electric motor by way of a series resistor when the ignition has been turned off. There is also provided, in parallel with the stop relay, a parallel circuit of a start relay and a drive relay having an energizing delay adjusted to the electric motor, which parallel circuit is connected in series with the parallel circuit of a make contact of the clutch relay and a make contact of the start relay. Furthermore, a protective relay is provided in cooperation with at least two limit value stages. One limit value stage monitors the product of the armature current of the electric motor, exceeding a critical value and the time and is directly connected to the protective relay, and another limit value stage monitors the condition where the rated speed falls below a certain value upon full energization and is connected by way of a break contact of the brake relay to the protective relay. Additionally, at least two additional limit value stages with optical and/or acoustical signalling devices are provided wherein one additional limit value stage triggers a signal once a maximally permitted motor speed has been exceeded, and another additional limit value stage triggers a signal once the armature current has exceeded a maximally permissible value.

In accordance with the present invention, a blocking system with a self-holding feature is created permitting the starting of the motor only when the power flow between the motor and the drive wheels has been interrupted, wherein, for the starting operation, the motor is connected to the battery by way of a series resistor which, with a time delay, is automatically short-circuited after the motor has attained its operating speed. Furthermore, this system also provides monitoring arrangements which interrupt the electric connection between the motor and the battery when the motor current, according to a certain time function, has exceeded its permissible maximum value, or when the motor speed falls below its rated value upon full energization, wherein the latter monitoring arrangement for the speed becomes effective only if the brake pedal is depressed without an operation of the clutch. Switching devices are also provided which, when the vehicle is shut down, short-circuit the armature end connections of the motor by way of the series resistor. Furthermore, signalling arrangements are included which transmit a signal if the speed or the current of the motor exceeds the respectively permitted critical values.

In most cases, it is more advantageous for starting the vehicle to interrupt the power flow by operating the clutch, rather than by adjusting the idling position of the transmission, since also in the latter case the clutch must be operated to shift into gear. The chronological function of the over-current protection is suitably fashioned so that, in case of rather high over-currents, the connection between the battery and the motor is, for the protection of the motor, opened within a shorter period of time than in case of smaller over-currents. This is accomplished in accordance with the present invention by providing the limit value stage controlling the current overload of the electric motor with an operational amplifier of an integrator circuit construction, to which can be fed a variable input proportional to the armature current limit value and a variable input proportional to the instantaneous armature current. An operational amplifier connected as a comparator is fed to the output signal of the operational amplifier connected as an integrator and a variable input proportional to the current overload and transmits a signal to the subsequent signalling device and/or relay once the value exceeds the value proportional to the permissible current overload.

In accordance with the present invention, it is possible for the driver, in between the responding of the signalling device due to an excessive motor current and the triggering of the overload protection device, to prevent the automatic engagement of the overload protection by corresponding measures (engagement of the clutch, change of gears).

These and further objects, features and advantages of the present invention will become more obvious from the following description when taken in connection with the accompanying drawings which show, for purposes of illustration only, one embodiment in accordance with the present invention; and wherein FIG. 1 shows a schematic view of the drive mechanism in accordance with the present invention;

Figure 1:
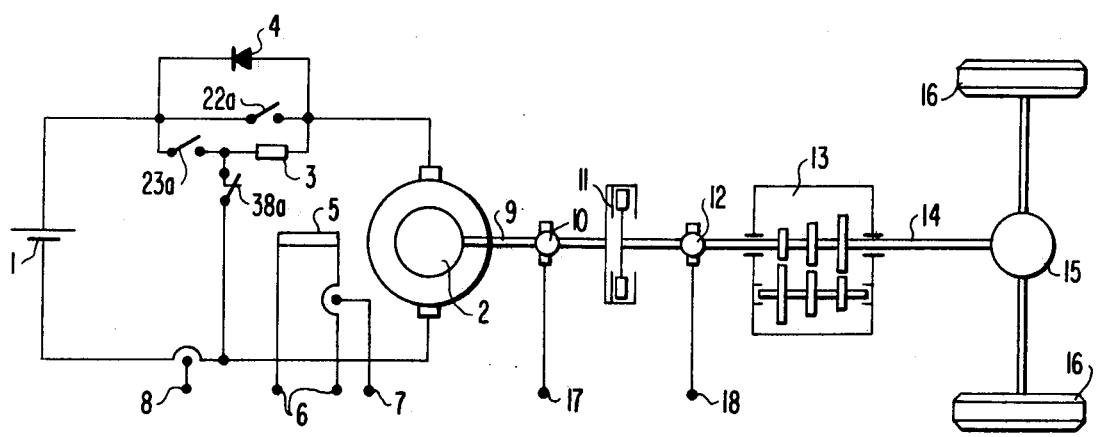

Referring now to the drawing wherein like reference numerals are used throughout the several views to designate like parts in this invention and the aforementioned patent, according to FIG. 1 and according to the aforementioned patent, the battery 1 supplies electrical energy to the armature terminals of a DC motor 2 of any conventional type by way of the contacts 22a (FIG. 1) of a main switch. The series circuit of a series resistance 3 together with the contacts 23a of an auxiliary switch, on the one hand, and the brake diode 4, on the other, are connected in parallel with the contacts 22a. The energizing field winding 5 of the electric motor 2 is supplied with electrical energy at the terminal 6 from the field control to be described more fully hereinafter. The actual-value of the field current is measured at the terminal 7 whereas the actual-value of the armature current is measured at the terminal 8 by conventional means. The electric motor 2 drives with its shaft 9, by way of a mechanical separating clutch 11, a change-speed transmission 13 whose output shaft 14 is connected by way of the axle gear 15 with the vehicle wheels 16. The rotational speed of the electric motor 2 and the input rotational speed of the change-speed transmission 13 or the rotational speed behind the clutch 11 are converted into suitable electrical signals in two transmitter devices, such as tachometer devices 10 and 12 of conventional type, whereby the signals are picked up at the points 17 and 18.

FIG. 1 in accordance with the present invention differs from FIG. 1 of the patent by the additional normally closed contact 38a which short-circuits the motor terminals of the motor 2 by way of the series resistor 3 when the vehicle is at a standstill.

Figure 2A:
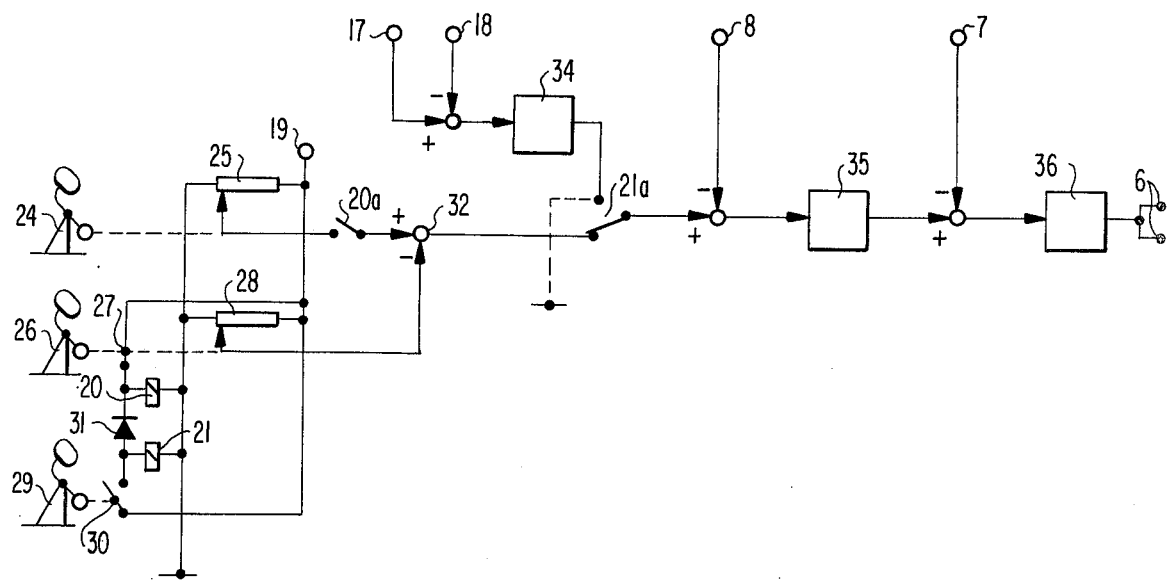
FIG. 2a illustrates a block-circuit diagram of the control arrangement.
Figure 2B:
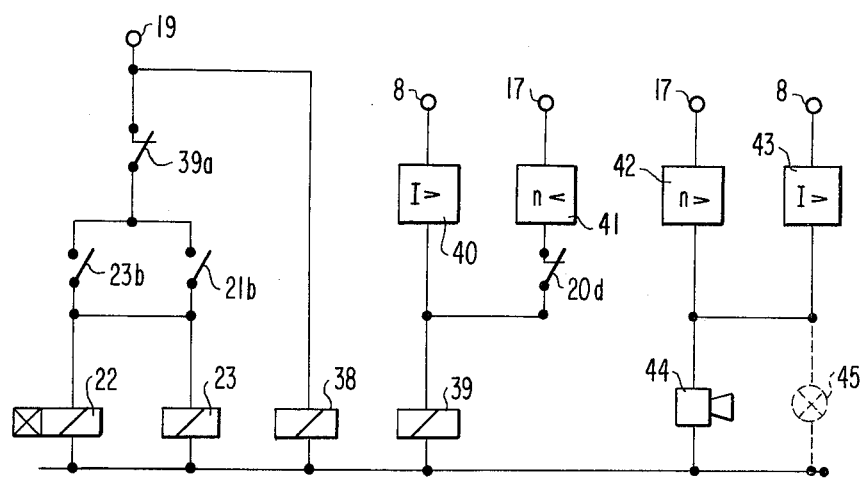
FIG. 2b illustrates a block-circuit diagram in accordance with the present invention.

In a similar manner, the arrangement of the control circuits in FIG. 2a is identical to that of FIG. 2 of the patent, except for the portion of the control system illustrated in FIG. 2b which serves for protecting the drive mechanism from inappropriate operating conditions in accordance with the present invention. According to FIG. 2a, which corresponds to FIG. 2 of the patent, a desired-value for the driving-current is predetermined by the driving pedal 24 by way of the potentiometer 25 which is fed at the terminal 19 from a fixed voltage. Similarly, a braking-current desired-value is predetermined by the brake pedal 26 by way of the potentiometer 28, whereby this predetermination takes place in a similar manner by the foot brake as also by the hand brake and the parking brake. During the actuation of the brake, the switch 27 is simultaneously opened whereby the relay 21 is de-energized and drop off. The desired-values are added in their correct sign at the point 32 by conventional means whereby a priority of the braking current predetermination with respect to the driving-current is assured by the contact 20a of the relay 20. On the one hand, the mechanical clutch 11 is disengaged by means of the clutch pedal 29 by a conventional connection (not shown) and on the other, during the actuation of the clutch 11, the contact 30 is closed so that the relay 21 and simultaneously also the relay 20 are energized by way of the diode 31 and attract their armatures thereby closing the corresponding switches.

The actual-values of the two rotational speeds in front of and to the rear of the mechanical clutch 11 which are supplied at the terminals 17 and 18, are subtracted from one another by conventional means and the difference is fed to a synchronizing control device 34 of conventional, known construction. This control device 34 advantageously exhibits an integral behavior according to the present invention, whereby it can be assured by a further contact (not shown) of the relay 21 that the starting value of the output voltage of the controller 34 is always zero during the actuation of the clutch 11 which corresponds to the fact that at this moment the two rotational speeds in front of and to the rear of the clutch are in agreement, i.e., are equal.

The output of the control device 34 as well as the desired-current-values combined in point 32 are fed to a shifting switch 21a which continues to transmit the desired-current-values predetermined at the driving and brake pedal as long as the clutch 11 has not been actuated. If the clutch 11 is actuated by depressing the clutch pedal 29, then the relay 21 is energized and shifts the contact 21a so that the desired-value for the armature current is now predetermined only by the control device 34. This desired-value is fed together with the actual-value of the armature current supplied at the terminal 8 to the current control device 35 of conventional, known construction, which derives therefrom a desired-value for the field energizing current. Together with the actual-value of the energizing current at the terminal 7, the energizing current control device 36 of conventional construction therewith influences the energizing winding connected to the terminal 6 in a suitable manner.

In the monitoring circuit shown in FIG. 2b, a fixed voltage applied to terminal 19 is fed, on the one hand, to a stop relay 38 and, on the other hand, by way of a normally closed contact 39a and by way of a make contact 21b actuated by the clutch relay 21 responding when the clutch pedal is depressed, to the start relay 23 and to the drive relay 22 inserted in parallel therewith, which drive relay includes a response delaying arrangement. A further make contact 23b of the start relay 23 is connected in parallel with the contact 21b, whereby a self-holding action of the start relay 23 is obtained during the operation of the contact 21b.

A protective relay 39 is fed by two limit value stages 40 and 41. In this connection, the protective relay is energized only if the measured value of the motor current fed to the terminal 8 exceeds a limit value set in the limit value stage 40, or if the value of the motor speed fed to the terminal 17 falls below a minimum value set in the limit value stage 41. The normally closed break contact 20d of the brake relay 20 is connected in series with the limit value stage 41 and ensures that the condition wherein the permissible engine speed is not reached leads to an operation of the protective relay 39 only if the brake pedal is depressed without an operation of the clutch. Thereby, the brake relay 20 is de-energized and the contact 20d is closed.

The signalling arrangement, which may be of an acoustical 44 or optical 45 type, respond if the motor speed fed to the terminal 17 or the motor current fed to the terminal 8 exceed respectively their permissible maximum values as determined by the limit value stages 42 and 43.

Figure 3:
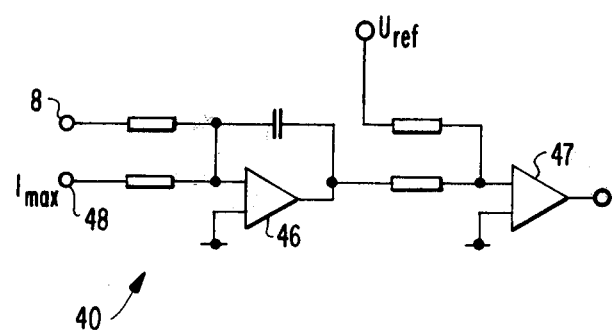
FIG. 3 illustrates details of the circuit of an over-current monitoring system.

FIG. 3 shows the construction of the limit value stage 40. An operational amplifier 46, connected as an integrator circuit, is fed on the one hand, at terminal 8, with the measured signal of the motor current measuring operation and on the other hand, at terminal 48, with a fixed voltage corresponding to the permissible maximum current $I_{max}$. The output of the amplifier 46 is connected via a resistor to an input of an operational amplifier 47, connected as a comparator circuit, which input is additionally fed with a fixed voltage value $U_{ref}$ by way of a further resistor. The output of the amplifier 47 is identical to the output of the limit value stage 40. This circuit ensures that the product, formed from the difference between the motor current and its permissible limit value, multiplied by the time period during which the current may exceed the permissible limit value, is constant. This means that very high motor currents cause the protective relay to respond after a very short period of time, thus interrupting the connection between the battery and the motor, whereas in case of only minor over-currents, overloads are permitted which are substantially longer in their duration.

This makes it possible to attain more advantageously adapted operating conditions than with the use of an over-current monitoring system which interrupts, independently of the time duration, the connection between the battery and the motor merely when a certain current limit value has been exceeded.

The mode of operation of the control system shown in FIGS. 2a and 2b is as follows. When the ignition key has been turned, the supply voltage is applied to terminal 19. This leads to an opening of the contact 38a (FIG. 1), thus eliminating the short circuit by way of the armature end connections of the motor 2. In contrast to the aforementioned patent, the motor can now be started via the make contact 23a and the series resistor 3, or directly by way of the make contact 22a, only if, by actuation of the clutch — switch 30 — the clutch relay 21 is energized, the contact 21b is closed, and subsequently the start relay 23 is energized by way of the self-holding contact 23b and remains in the energized condition. Thereafter, with a time delay adapted to the startup time of the motor, the drive relay 22 is then also energized and bridges the series resistor 3. The clutch can now be gradually engaged for the startup of the vehicle. The further setting of the driving conditions takes place by means of the control system in the manner already described in the patent.

If an unduly high motor current occurs during the driving operation, the self-holding action of the relays 22 and 23 and thus the connection between the battery and the motor is interrupted by the response of the protective relay 39 and the opening of the contact 39a, with a time evaluation as described hereinabove in connection with FIG. 3. This interruption is triggered in the same way by the limit value stage 41, if the speed of the motor falls below its rated value, but only if the brake is actuated at the same time, without there being a simultaneous actuation of the clutch.

It can be seen from the circuit arrangement that, after interruption of the connection between the battery and the motor due to a disturbance, the clutch must again be actuated to start up the engine in the manner described above.

When the vehicle is shut off, and thus the fixed supply voltage 19 is disconnected, the motor is short-circuited via the series resistor 3 and the contact 38a, which is closed in this case. Thus, a rapid braking of the flywheel mass of the motor is attained, in conjunction with a device (not shown) which provides that the energizing current can still flow for about 2 seconds after the vehicle has been turned off. In some cases, this additional device can also be omitted, if the inductance of the energizing winding, together with the associated idling diode, ensures a sufficiently gradual fading of the energizing current after the vehicle has been turned off.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. In a drive arrangement with the use of an electric motor having an armature and a field winding for trackless vehicles, in which the rotational speed adjustment takes place by varying the field energization of the motor and which includes a separating clutch means connected behind the motor as well as a change-speed transmission means having at least two speeds in the forward driving direction, a first field energizing current control means controlling the energization of the field winding, a second current control means producing the desired value of the field energizing current operatively connected with its output to the input of the first current control means, the second current control means having two inputs to which are applied, on the one hand, the actual-value of the armature current and, on the other, a desired value for the armature current, and means including selectively operable means for determining the desired value of the armature current with a non-actuated separating clutch means and automatic means for automatically controlling the desired value of the armature current when the separating clutch means is actuated, the improvement comprising stop relay means for influencing the braking of the electric motor, the stop relay means being energized by an ignition switch means which couples a supply of electrical power to the drive arrangement when the ignition switch means is closed, said stop relay means including contact means responsive to the opening of the ignition switch means which deenergizes the stop relay for connecting a resistor across the ends of the armature winding of the electric motor for short-circuiting the armature winding.

2. A drive arrangement according to claim 1, further comprising a parallel circuit of a start relay means for influencing the supply of electrical power to the electric motor during the starting condition and a drive relay means for influencing the supply of electric power to the electric motor during the driving condition, the parallel circuit being connected in parallel with the stop relay means.

3. A drive arrangement according to claim 2, wherein the drive relay means is provided with an energizing delay corresponding to the electric motor, the parallel circuit being connected in series with a parallel circuit of a make contact of a clutch relay means and a make contact of the start relay means.

4. A drive arrangement according to claim 2, further comprising protective relay means for influencing the energization of the start relay means and the drive relay means, and at least one limit value means responsive to an operating condition of the electric motor one of exceeding and falling below a predetermined limit value for influencing the energization of the protective relay means.

5. A drive arrangement according to claim 4, further comprising a normally closed contact coupled between the supply of electric power and the parallel circuit of the drive relay means and the start relay means, said normally closed contact being responsive to said protective relay to open thereby disconnecting the supply of electric power to the parallel circuit of the drive relay means and the start relay means when the protective relay means is energized.

6. A drive arrangement according to claim 4, wherein at least two limit value means are provided, one limit value means being responsive to the armature current of the electric motor for monitoring the product of the armature current of the electric motor exceeding a predetermined limit value having a time condition and being directly connected to the protective relay means, and another limit value means being responsive to the speed of the electric motor for monitoring whether the speed of the electric motor falls below a predetermined value upon full energization, the another limit value means being connected to the protective relay means through a break contact of a brake relay means.

7. A drive arrangement according to claim 6, wherein the one limit value means for monitoring the product of the armature current and time includes a first operational amplifier means forming an integrator and receiving a signal proportional to the armature current limit value and a signal proportional to the instantaneous armature current, the first operational amplifier means providing an integrated output signal, and a second operational amplifier means forming a comparator, the second operational amplifier means receiving the output signal of the first operational amplifier means and a signal proportional to the current overload, the second operational amplifier means providing an output signal to the protective relay means when the predetermined current overload is exceeded.

8. A drive arrangement according to claim 4, further comprising at least one additional limit value means responsive to an operating condition of the electric motor one of exceeding and falling below a predetermined limit value and for providing an indication thereof.

9. A drive arrangement according to claim 8, wherein the one limit value means for monitoring the product of the armature current and time includes a first operational amplifier means forming an integrator and receiving a signal proportional to the armature current limit value and a signal proportional to the instantaneous armature current, the first operational amplifier means providing an integrated output signal, and a second operational amplifier means forming a comparator, the second operational amplifier means receiving the output signal of the first operational amplifier means and a signal proportional to the current overload, the second operational amplifier means providing an output signal to the protective relay means when the predetermined current overload is exceeded.

10. A drive arrangement according to claim 8, wherein the break contact means of the stop relay means connects a series resistor across the ends of the armature winding of the electric motor for short-circuiting the armature winding.

11. A drive arrangement according to claim 10, wherein the drive relay means is provided with an energizing delay corresponding to the electric motor, the parallel circuit being connected in series with a parallel circuit of a make contact of a clutch relay means and a make contact of the start relay means.

12. A drive arrangement according to claim 11, wherein at least two limit value means are provided, one limit value means being responsive to the armature current of the electric motor for monitoring the product of the armature current of the electric motor exceeding a predetermined limit value having a time condition and being directly connected to the protective relay means, and another limit value means being responsive to the speed of the electric motor for monitoring whether the speed of the electric motor falls below a predetermined value upon fall energization, the another limit value means being connected to the protective relay means through a break contact of a brake relay means.

13. A drive arrangement according to claim 12, wherein at least two additional limit value means are provided and connected with at least one of an optical and an acoustical signalling means, one additional limit value means being responsive to motor speed for triggering a signal of the at least one signalling means when a predetermined maximum motor speed is exceeded, and another additional limit value means being responsive to the armature current for triggering a signal of the at least one signalling means when the armature current exceeds a predetermined maximum value.

14. A drive arrangement according to claim 13, wherein the one limit value means for monitoring the product of the armature current and time includes a first operational amplifier means forming an integrator and receiving a signal proportional to the armature current limit value and a signal proportional to the instantaneous armature current, the first operational amplifier means providing an integrated output signal, and a second operational amplifier means forming a comparator, the second operational amplifier means receiving the output signal of the first operational amplifier means and a signal proportional to the current overload, the second operational amplifier means providing an output signal to the protective relay means when the predetermined current overload is exceeded.

15. A drive arrangement according to claim 14, further comprising first switch means associated with a brake pedal and arranged to open upon braking, the first switch means being disposed in a brake relay means energizing circuit, second switch means associated with a clutch pedal and arranged to close when the separating clutch means is non-actuated, the second switch means being connected in a clutch relay means energizing circuit, and a blocking diode means provided between the first and second switch means for preventing energization of the clutch relay during braking and enabling energization of the brake relay during non-actuation of the separating clutch means.

16. A drive arrangement according to claim 2, further comprising at least one limit value means responsive to an operating condition of the electric motor one of exceeding and falling below a predetermined limit value and for providing an indication thereof.

17. A drive arrangement according to claim 16, wherein at least two limit value means are provided and connected with at least one of an optical and an acoustical signalling means, one limit value means being responsive to motor speed for triggering a signal of the at least one signalling means when a predetermined maximum motor speed is exceeded, and another limit value means being responsive to the armature current for triggering a signal of the at least one signalling means when the armature current exceeds a predetermined maximum value.

18. A drive arrangement according to claim 1, further comprising first switch means associated with a brake pedal and arranged to open upon braking, the first switch means being disposed in a brake relay means energizing circuit, second switch means associated with a clutch pedal and arranged to close when the separating clutch means is non-actuated, the second switch means being connected in a clutch relay means energizing circuit, and a blocking diode means provided between the first and second switch means for preventing energization of the clutch relay during braking and enabling energization of the brake relay during non-actuation of the separating clutch means.

19. A drive arrangement according to claim 1, wherein the stop relay means connects the resistor across the ends of the armature winding only when the ignition switch means is open.

20. A drive arrangement according to claim 1, wherein the contact means for coupling the resistor across the ends of the armature winding opens when the ignition switch means is closed, the drive arrangement further comprising contact means for connecting the resistor is series between the source of electrical power and one end of the armature winding when the ignition switch means is closed.

* * * * *